United States Patent
Adya et al.

(10) Patent No.: US 12,452,520 B2
(45) Date of Patent: Oct. 21, 2025

(54) SELECTIVELY USING SENSORS FOR CONTEXTUAL DATA

(71) Applicant: Apple Inc., Cupertino, CA (US)

(72) Inventors: Saurabh Adya, San Jose, CA (US); Myra C. Lukens, San Francisco, CA (US); Aswath Manoharan, Sunnyvale, CA (US); Alkeshkumar M. Patel, San Jose, CA (US)

(73) Assignee: Apple Inc., Cupertino, CA (US)

( * ) Notice: Subject to any disclaimer, the term of this patent is extended or adjusted under 35 U.S.C. 154(b) by 79 days.

(21) Appl. No.: 18/112,371

(22) Filed: Feb. 21, 2023

(65) Prior Publication Data
US 2023/0199297 A1  Jun. 22, 2023

Related U.S. Application Data

(63) Continuation of application No. PCT/US2021/046959, filed on Aug. 20, 2021.

(60) Provisional application No. 63/068,589, filed on Aug. 21, 2020.

(51) Int. Cl.
*H04N 23/63* (2023.01)
*G06F 3/01* (2006.01)
*G10L 15/18* (2013.01)

(52) U.S. Cl.
CPC ........... *H04N 23/631* (2023.01); *G06F 3/013* (2013.01); *G10L 15/1815* (2013.01); *H04N 23/633* (2023.01)

(58) Field of Classification Search
CPC .... H04N 23/631; H04N 23/633; G06F 3/013; G10L 15/1815
USPC .................................................. 348/333.02
See application file for complete search history.

(56) References Cited

U.S. PATENT DOCUMENTS

| | | |
|---|---|---|
| 2018/0293221 A1 | 10/2018 | Finkelstein et al. |
| 2020/0202849 A1* | 6/2020 | Cartwright .......... G10L 15/1815 |
| 2021/0081749 A1* | 3/2021 | Claire ..................... G06F 3/005 |

FOREIGN PATENT DOCUMENTS

WO  WO-2019018061 A1 *  1/2019  ......... G06F 16/3329

OTHER PUBLICATIONS

International Preliminary Report on Patentability received for PCT Patent Application No. PCT/US2021/046959, mailed on Mar. 2, 2023, 8 pages.
International Search Report and Written Opinion received for PCT Patent Application No. PCT/US2021/046959, mailed on Nov. 17, 2021, 11 pages.
Office Action received for European Patent Application No. 21773190.0, mailed on May 28, 2024, 5 pages.

(Continued)

*Primary Examiner* — Joel W Fosselman
(74) *Attorney, Agent, or Firm* — DLA Piper LLP (US)

(57) ABSTRACT

Systems and processes for operating a digital assistant are provided. An example process for determining a response includes, at an electronic device having one or more processors and memory, receiving a spoken input including a request, performing a semantic analysis on the spoken input, determining, based on the semantic analysis, a likelihood that the electronic device requires additional contextual data to satisfy the request, and in accordance with the determined likelihood exceeding a threshold, enabling a camera of the electronic device and determining a response to the request based on data captured by the camera of the electronic device.

48 Claims, 7 Drawing Sheets

(56) References Cited

OTHER PUBLICATIONS

Intention to Grant received for European Patent Application No. 21773190.0, mailed on Mar. 21, 2025, 9 pages.
Decision to Grant received for European Patent Application No. 21773190.0, mailed on Jul. 31, 2025, 2 pages.

* cited by examiner

SELECTIVELY USING SENSORS FOR CONTEXTUAL DATA

CROSS REFERENCE TO RELATED APPLICATIONS

This application is a continuation of PCT application No. PCT/US2021/046959, entitled "SELECTIVELY USING SENSORS FOR CONTEXTUAL DATA," filed Aug. 20, 2021 which claims the benefit of U.S. Provisional Application No. 63/068,589, entitled "SELECTIVELY USING SENSORS FOR CONTEXTUAL DATA," filed Aug. 21, 2020, the content of which is hereby incorporated by reference in its entirety for all purposes.

FIELD

This relates generally to digital assistant and, more specifically, to determining when to enable various sensors of an electronic device using a digital assistant in various computer-generated reality technologies.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, a user may provide a request that is ambiguous, particularly when in use with various computer-generated reality technologies; for example, a user request such as "what is that?". Thus, it may be difficult for the digital assistant to determine an appropriate response to the request.

SUMMARY

Example methods are disclosed herein. An example method includes, at an electronic device having one or more processors and memory, receiving a spoken input including a request, performing a semantic analysis on the spoken input, determining, based on the semantic analysis, a likelihood that the electronic device requires additional contextual data to satisfy the request, and in accordance with the determined likelihood exceeding a threshold, enabling a camera of the electronic device and determining a response to the request based on data captured by the camera of the electronic device.

Example non-transitory computer-readable media are disclosed herein. An example non-transitory computer-readable storage medium stores one or more programs. The one or more programs comprise instructions, which when executed by one or more processors of an electronic device, cause the electronic device to receive a spoken input including a request, perform a semantic analysis on the spoken input, determine, based on the semantic analysis, a likelihood that the electronic device requires additional contextual data to satisfy the request, and in accordance with the determined likelihood exceeding a threshold, enable a camera of the electronic device and determine a response to the request based on data captured by the camera of the electronic device.

Example electronic devices are disclosed herein. An example electronic device comprises one or more processors; a memory; and one or more programs, where the one or more programs are stored in the memory and configured to be executed by the one or more processors, the one or more programs including instructions for receiving a spoken input including a request, performing a semantic analysis on the spoken input, determining, based on the semantic analysis, a likelihood that the electronic device requires additional contextual data to satisfy the request, and in accordance with the determined likelihood exceeding a threshold, enabling a camera of the electronic device and determining a response to the request based on data captured by the camera of the electronic device.

An example electronic device comprises means for receiving a spoken input including a request, performing a semantic analysis on the spoken input, determining, based on the semantic analysis, a likelihood that the electronic device requires additional contextual data to satisfy the request, and in accordance with the determined likelihood exceeding a threshold, enabling a camera of the electronic device and determining a response to the request based on data captured by the camera of the electronic device.

Determining, based on the semantic analysis, a likelihood that the electronic device requires additional contextual data to satisfy the request allows a digital assistant to efficiently determine whether to enable one or more sensors of an electronic device. For example, determining whether additional contextual data is required in this manner allows the digital assistant to selectively determine which sensors may be helpful and enable them in a quick and efficient manner. Thus, this provides for more efficient use of the electronic device (e.g., by only enabling the sensors which will be helpful), which, additionally, reduces power usage and improves battery life of the device by enabling the user to use the device more quickly and efficiently. Further, only enabling the one or more sensors of the electronic device when required provides privacy benefits as everything a user does or interacts with is not captured. Rather, specific activities that will be helpful to the user may be captured with the enabled sensors while all others are not captured.

DESCRIPTION

Figure 1A:
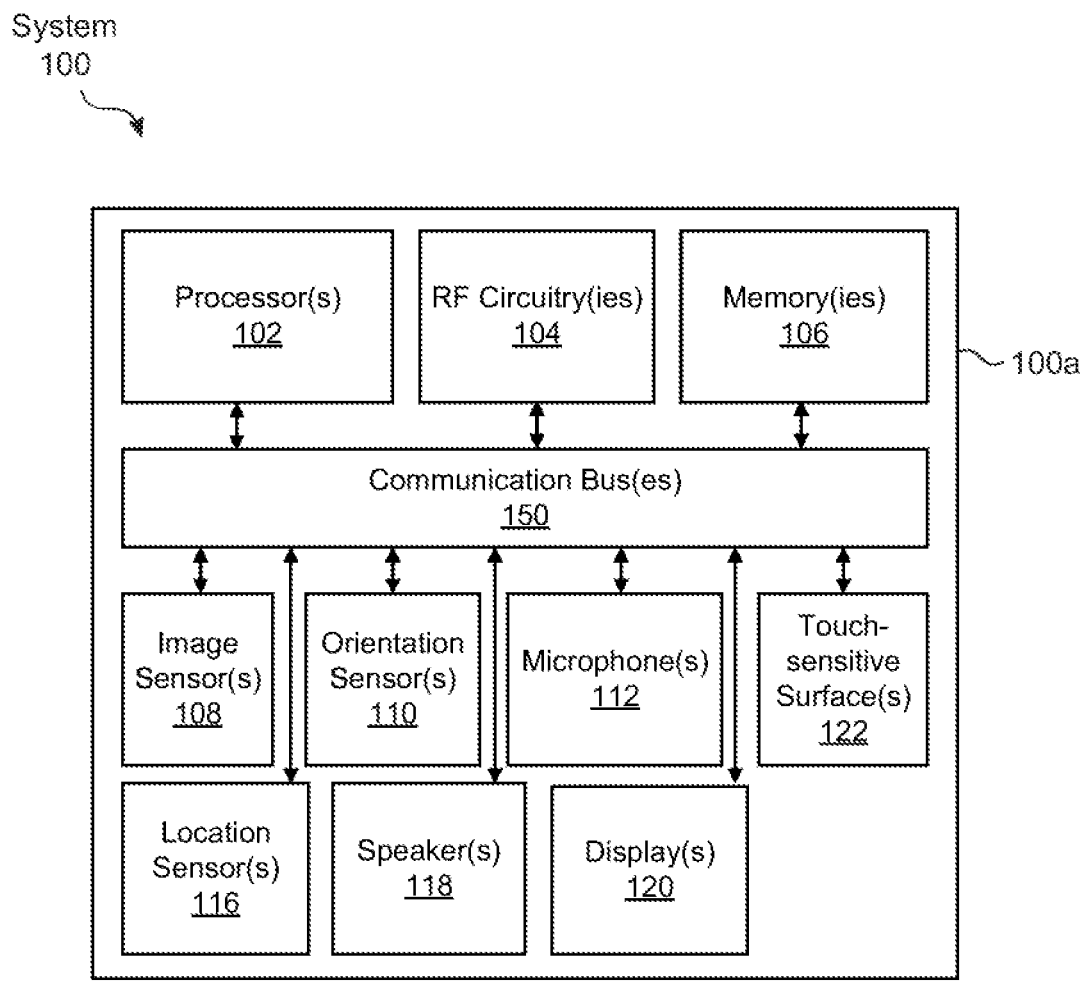
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
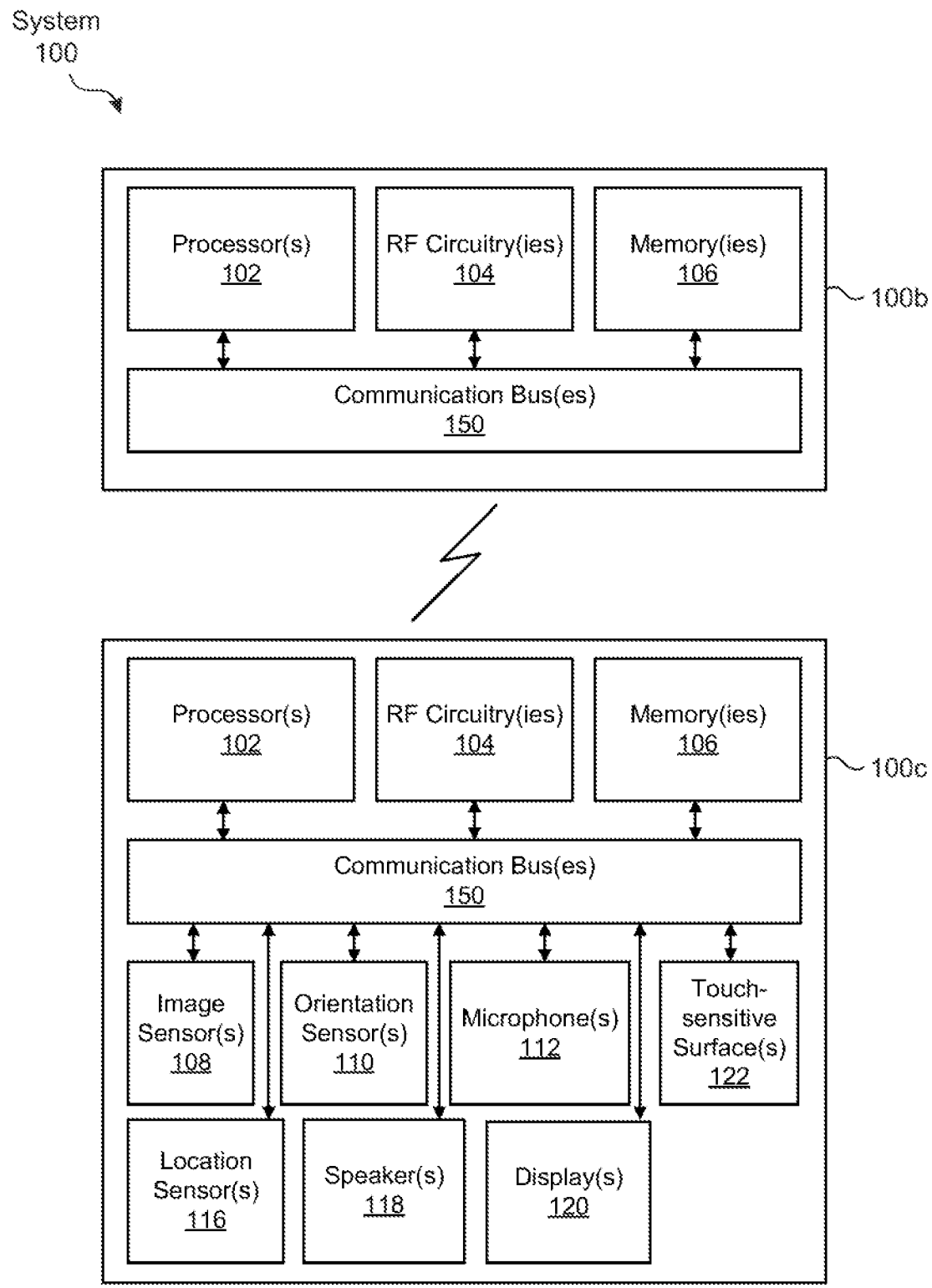

FIG. 1A and FIG. 1B depict exemplary system 100 for use in various computer-generated reality technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is a head-mounted display (HIVID) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
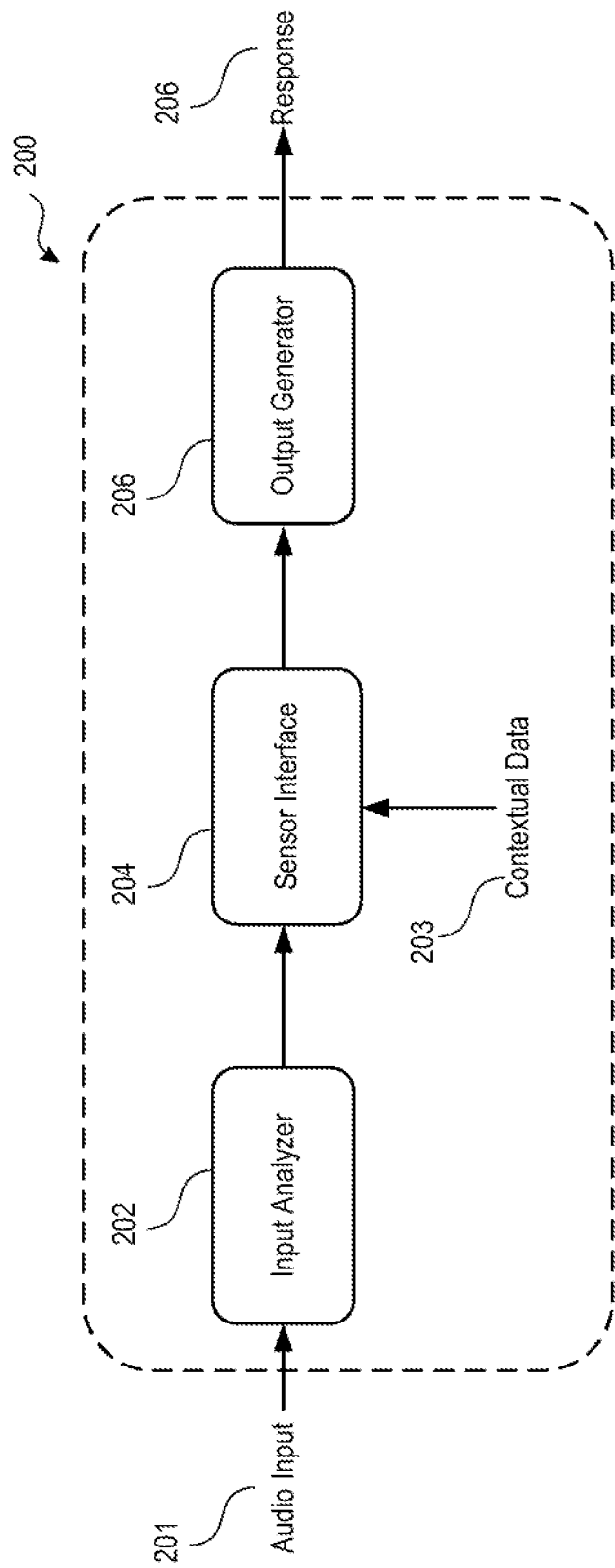
FIG. 2 depicts an exemplary digital assistant for determining a response to user requests.

FIG. 2 depicts exemplary digital assistant 200 for determining a response to user requests. In some examples, as illustrated in FIG. 2, digital assistant 200 includes input analyzer 202, sensor interface 204, and output generator 206. In some examples, digital assistant 200 may optionally include a reference resolution module, as discussed further below. In some examples, digital assistant 200 is implemented on electronic device 100. In some examples, digital assistant 200 is implemented across other devices (e.g., a server) in addition to electronic device 100. In some examples, some of the modules and functions of the digital assistant are divided into a server portion and a client portion, where the client portion resides on one or more user devices (e.g., electronic device 100) and communicates with the server portion through one or more networks.

It should be noted that digital assistant 200 is only one example of a digital assistant, and that digital assistant 200 can have more or fewer components than shown, can combine two or more components, or can have a different configuration or arrangement of the components. The various components shown in FIG. 2 are implemented in hardware, software instructions for execution by one or more processors, firmware, including one or more signal processing and/or application specific integrated circuits, or a combination thereof. In some examples, digital assistant 200 connects to one or more components and/or sensors of electronic device 100 as discussed further below.

Digital assistant 200 receives spoken input 201 including a request from a user and provides spoken input 201 to input analyzer 202. After receiving spoken input 201, input analyzer 202 performs a semantic analysis on spoken input 201. In some examples, performing the semantic analysis includes performing automatic speech recognition (ASR) on spoken input 201. In particular, input analyzer 202 can include one or more ASR systems that process spoken input 201 received through input devices (e.g., a microphone) of electronic device 100. The ASR systems extract representative features from the speech input. For example, the ASR systems pre-processor performs a Fourier transform on the spoken input 201 to extract spectral features that characterize the speech input as a sequence of representative multi-dimensional vectors.

Further, each ASR system of input analyzer 202 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognition results (e.g., phonemes, phonemic strings, and sub-words), and ultimately, text recognition results (e.g., words, word strings, or sequence of tokens).

In some examples, performing semantic analysis includes performing natural language processing on spoken input 201. In particular, once input analyzer 202 produces recognition results containing a text string (e.g., words, or sequence of words, or sequence of tokens) through ASR, input analyzer 202 may deduce an intent of spoken input 201. In some examples, input analyzer 202 produces multiple candidate text representations of the speech input. Each candidate text representation is a sequence of words or tokens corresponding to spoken input 201. In some examples, each candidate text representation is associated with a speech recognition confidence score. Based on the speech recognition confidence scores, input analyzer 202 ranks the candidate text representations and provides the n-best (e.g., n highest ranked) candidate text representation(s) to other modules of digital assistant 200 for further processing.

In some examples, performing the semantic analysis includes determining whether the request of spoken input 201 includes an ambiguous term. In some examples, the ambiguous term is a deictic reference. A deictic reference is a word or phrase that ambiguously references something like an object, time, person, or place. Exemplary deictic references include but are not limited to "that," "this," "here," "there," "then," "those," "them," "he," "she," etc. particularly when used with a question such as the questions "what is this?," "where is that?," and "who is he?" Accordingly, input analyzer 202 determines whether the request includes one of these words or words like them and thus, whether the use of the word is ambiguous. For example, in the spoken input "what is that?" input analyzer 202 may determine that "that" is a deictic reference through ASR and/or NLP. Similarly, in spoken input 201 "when was this built?" input analyzer 202 determines that "this" is a deictic reference. In both examples, input analyzer 202 may determine "that" and "this" to be ambiguous because the user input does not include a subject or object that could be referred to with "that" or "this."

After performing the semantic analysis, input analyzer 202 determines a likelihood that additional contextual data is required to satisfy the request. In some examples, the likelihood that additional contextual data is required to satisfy the request is based on movement of electronic device 100 during receipt of spoken input 201. For example, when electronic device 100 is a head mounted device, the user may move their head and thus electronic device 100 while providing the word "that" of spoken input 201. Accordingly, input analyzer 202 may determine that the user was indicating a possible object with the reference "that" because electronic device 100 moved near the same time the user provided "that" in spoken input 201. Input analyzer may then determine a high likelihood that additional contextual data is required to satisfy the request because of the ambiguous reference "that" and the movement provided at the same time, indicating an object.

It should be understood that gestures or other information detected near the same time as words provided in spoken input 201 may be detected at the same time as the words in spoken input 201 or at substantially the same time as the words in spoken input 201. For example, the gestures and other information discussed below may be received at the same as the spoken input 201, a short time before spoken input 201 (e.g., 2 seconds, 1 second, 10 milliseconds, 5 milliseconds, etc.) or a short time after spoken input 201 (e.g., 2 seconds, 1 second, 10 milliseconds, 5 milliseconds, etc.).

As another example, when electronic device 100 is a handheld electronic device such as a smart phone, the user may gesture with electronic device 100 by moving electronic device 100 towards an object while providing the word "that" of spoken input 201. Accordingly, similar to the example above, input analyzer 202 may determine that the user was indicating a possible object with the reference "that" because electronic device 100 moved towards an object near the same time as the user provided "that" in spoken input 201. Input analyzer may then determine a high likelihood that additional contextual data is required to satisfy the request because of the ambiguous reference "that" and the movement.

In some examples, when electronic device 100 is a handheld electronic device such as a smart phone, the user may gesture towards a screen of electronic device 100 (e.g., pointing at a portion of the screen) or on a screen of electronic device (e.g., tapping a portion of the screen) while providing "that" of spoken input 201. Accordingly, input analyzer 202 may determine that the user was indicating a possible object with the reference "that" because electronic device 100 detected a gesture towards or on a screen of electronic device 100 near the same time as the user provided "that" in spoken input 201. For example, the screen of electronic device 100 may be displaying multiple landmarks and the user may point at one while saying "that," and thus, input analyzer 202 may determine that the user is gesturing towards the one object and thus intends to reference that object. Input analyzer 202 may then determine a high likelihood that additional contextual data is required to satisfy the request because of the ambiguous reference "that" and the movement towards or on the screen of electronic device 100.

In some examples, the likelihood that additional contextual data is required is based on whether movement of electronic device 100 ceases during receipt of spoken input 201. For example, while receiving the spoken input "what is that over there?" electronic device 100 may stop moving (e.g., linger) for a brief time while the user provides "that" of spoken input 201. Accordingly, input analyzer 202 may determine that the user was indicating a possible object with the reference "that" because electronic device 100 stopped moving near the same time as "that" was uttered in spoken input 201. Input analyzer may then determine a high likelihood that additional contextual data is required to satisfy the request because of the ambiguous reference "that" and the ceasing of movement of electronic device 100.

In contrast, while receiving the spoken input "what is that over there?" electronic device 100 may continuously move because, for example, the user is scanning the horizon while providing spoken input 201. Accordingly, input analyzer 202 may determine that the movement or ceasing of movement did not indicate any potential object the user is referencing and thus determine a low likelihood that additional contextual data is required to satisfy the request.

In some examples, the likelihood that additional contextual data is required is based on movement of electronic device 100 for a predetermined time after receiving spoken input 201. Thus, as discussed above with reference to movement or ceasing of movement detected during receipt of spoken input 201, input analyzer 202 may determine whether electronic device 100 moves during a predetermined time (e.g., 1 second, 2 seconds, 5 seconds, 10 seconds, etc.) after receiving spoken input 201. If electronic device 100 moves during that predetermined time, input analyzer 202 may determine that the movement was indicating an object and thus determine a high likelihood that additional contextual data is required.

In some examples, determining whether movement of electronic device 100 ceases includes determining whether movement of electronic device 100 is below a threshold for a predetermined time. The movement threshold includes six inches of movement, a foot of movement, two feet of movement, or any other amount of movement useful for determining whether the user intends to move electronic device 100. The predetermined time includes one second, five seconds, ten seconds, etc. For example, while electronic device 100 receives spoken input 201, electronic device 100 may detect small movements indicative of the normal movements a user makes when not intending to provide a gesture or any other meaningful movement of electronic device 100. Thus, the movements may be less than the threshold of one foot of movement for five seconds. Accordingly, input analyzer 202 may determine that electronic device 100 has ceased moving because the movement is below the threshold for the predetermined time.

In some examples, the likelihood that additional contextual data is required is based on a field of view of electronic device 100 near in time to receiving spoken input 201. In particular, the user may change the field of view of electronic device 100 by moving from looking at something close by to looking at something far away and near the same time provide the spoken input "what is that?". For example, electronic device 100 may be receiving a field of view of a tree and the user may glance behind the tree at a tower while providing the spoken input "what is that?". Accordingly, input analyzer 202 may determine that the user was indicating the tower with the reference "that" because electronic device 100 detected that the field of view of electronic device 100 changed from the tree to the tower near the same time as the user provided "that" in spoken input 201.

In some examples, the likelihood that additional contextual data is required is based on a pose of electronic device 100 after receiving spoken input 201. For example, after receiving spoken input 201 of "what is in that direction?" input analyzer 202 may determine that electronic device 100 is rotated in a pose pointing a new direction. Accordingly, input analyzer 202 may determine a high likelihood that additional contextual data that would indicate the direction is required to help determine a response to spoken input 201.

In some examples, the likelihood that additional contextual data is required is based on a detected gaze of the user during receipt of spoken input 201. In some examples, digital assistant 200 detects the gaze of the user based on movement or orientation of electronic device 100. For example, when electronic device 100 is a wearable device like a head mounted display, the view of electronic device 100 is also the view of a user wearing electronic device 100. Thus, digital assistant 200 may determine the user gaze associated with spoken input 201 to be the direction that electronic device 100 is facing or is oriented towards. Accordingly, digital assistant 200 may determine that the user is looking in a specific direction and thus input analyzer 202 may determine a high likelihood that additional contextual data is required.

In some examples, digital assistant 200 detects the user gaze based on a front facing camera or other sensor of electronic device 100. Thus, when electronic device 100 is a phone, the user may look at the display of electronic device 100. Accordingly, electronic device 100 may receive an image of the user's face with a front facing camera and based on this image digital assistant 200 can determine where the user is looking while providing spoken input 201, thus determining a user gaze associated with spoken input 201. Accordingly, digital assistant 200 may determine that the user gaze is looking at a specific point on the display and thus input analyzer 202 may determine a low likelihood that additional contextual data is required. Conversely, input digital assistant 200 may determine that the user gaze is looking away from the display and thus input analyzer 202 may determine a high likelihood that additional contextual data is required because the user is likely referencing something not being displayed.

In some examples, the likelihood that additional contextual data is required is based on a location of electronic device 100 during or after receiving spoken input 201. For example, when digital assistant 200 receives the spoken input 201 "what is that?" digital assistant 200 may also receive data indicating that the user is near several landmarks such as the Brooklyn Bridge and the Statue of Liberty. Accordingly, input analyzer 202 may determine that because the user is near several landmarks and has provided spoken input 201 of "what is that?" there is a high likelihood that additional contextual data is required to determine which landmark the user intended with "that." Conversely, digital assistant 200 may receive the same spoken input 201 "what is that?" while the user is standing directly next to the Eiffel Tower. Accordingly, input analyzer 202 may determine that because the user is directly next to the Eiffel Tower (and possibly facing or gesturing towards it as described above) there is a low likelihood that additional contextual data is required to satisfy the user's request.

In some examples, the likelihood that additional contextual data is required is based on historical interaction data between digital assistant 200 and a user. For example, digital assistant 200 may receive spoken input 201 of "what do they eat?" after providing an output of "that animal is an opossum." Accordingly, input analyzer 202 may then determine that because user input 201 includes "they" spoken input 201 likely references the recent exchange between digital assistant 200 and the user related to opossums. Thus, input analyzer 202 may determine there is a low likelihood that additional context is required to satisfy the user's request.

In some examples, the likelihood that additional contextual data is required is based on whether a virtual reality mode or an augmented reality mode of electronic device 100 is active. In some examples, digital assistant 200 determines whether a virtual reality mode or an augmented reality mode of electronic device 100 is active based on whether one or more virtual reality or augmented reality objects are being generated and/or displayed. For example, digital assistant 200 may determine that a virtual reality object such as an airplane is being generated and displayed to the user and thus that a virtual reality mode is active. Accordingly, when digital assistant 200 receives spoken input 201 "who makes this?" input analyzer 202 may determine that spoken input 201 is likely referencing the virtual reality airplane and thus determine there is a low likelihood that additional contextual data is required to satisfy the user's request.

Conversely, in some examples, the likelihood that additional contextual data is required is not based on whether a virtual reality mode of electronic device 100 is active and instead on one of the other factors described herein. For example, digital assistant 200 may determine that electronic device 100 is generating a virtual reality environment including several paintings. Digital assistant 200 may then receive spoken input 201 "who painted that one?". Thus, input analyzer 202 may determine that "that one" of spoken input 201 is ambiguous because it is unclear which of the virtual paintings the user is referencing. Accordingly, input analyzer 202 may determine a high likelihood that additional contextual data is required to satisfy the user's request. Additionally, in some examples, input analyzer 202 may detect a gesture of the user, a gaze of the user, etc. to further inform the likelihood that additional contextual data is required, as described above.

It will be understood that the factors described above used to determine a likelihood that additional contextual data is required to satisfy the request of spoken input 201 may be examined in combinations of one or more by input analyzer 202 to determine the likelihood based on the data available from electronic device 100 at one time.

After determining the likelihood that additional contextual data is required, input analyzer 202 determines if the likelihood that additional contextual data is required exceeds a predetermined threshold. In some examples, the predetermined threshold is a threshold that indicates that the likelihood that additional contextual data is required is sufficiently high that digital assistant 200 should acquire additional data in order to determine how to respond to a user's request. The predetermined threshold may be any number indicative of this importance including, for example, 5, 10, 25, 50, 100, etc.

In some examples, the predetermined threshold may be adjusted as more requests are received and successfully answered by digital assistant 200 based on whether the additional contextual data was necessary to respond to the user's request of spoken input 201. For example, if input analyzer 202 determines that additional contextual data is required because the likelihood that additional contextual data is required is over a predetermined threshold of 50 and the contextual data 203 received by one or more sensors was not necessary to respond to the user's request, the predetermined threshold may be increased to, for example, 60. Similarly, if input analyzer 202 determines that additional contextual data is not required because the likelihood that additional contextual data is required is below a predetermined threshold of 50 and digital assistant 200 later determines that contextual data 203 received by one of the sensors was necessary to respond to the user's request, the predetermined threshold may be decreased to, for example, 45.

If the likelihood that additional contextual data is required exceeds a predetermined threshold, digital assistant 200 causes sensor interface 204 to enable one or more sensors of electronic device 100 such as image sensors 108, orientation sensors 110, and location sensors 116. The sensors of electronic device 100 includes one or more cameras (e.g., image sensors 108), gyroscopes (e.g., orientation sensors 110), accelerometers (e.g., orientation sensors 110), altimeters (e.g., orientation sensors 110), GPS sensors (e.g., location sensors 116), and network detectors (e.g., location sensors 116). Accordingly, when digital assistant 200 determines that the likelihood exceeds the predetermined threshold, digital assistant 200 causes sensor interface 204 to enable one of the camera, gyroscope, accelerometer, altimeter, GPS sensor, or network detectors of electronic device 100. Thus, the contextual data received includes a picture, a video stream, acceleration data, altitude data, GPS data, network data, rotation data, speed data, etc.

Figure 3:
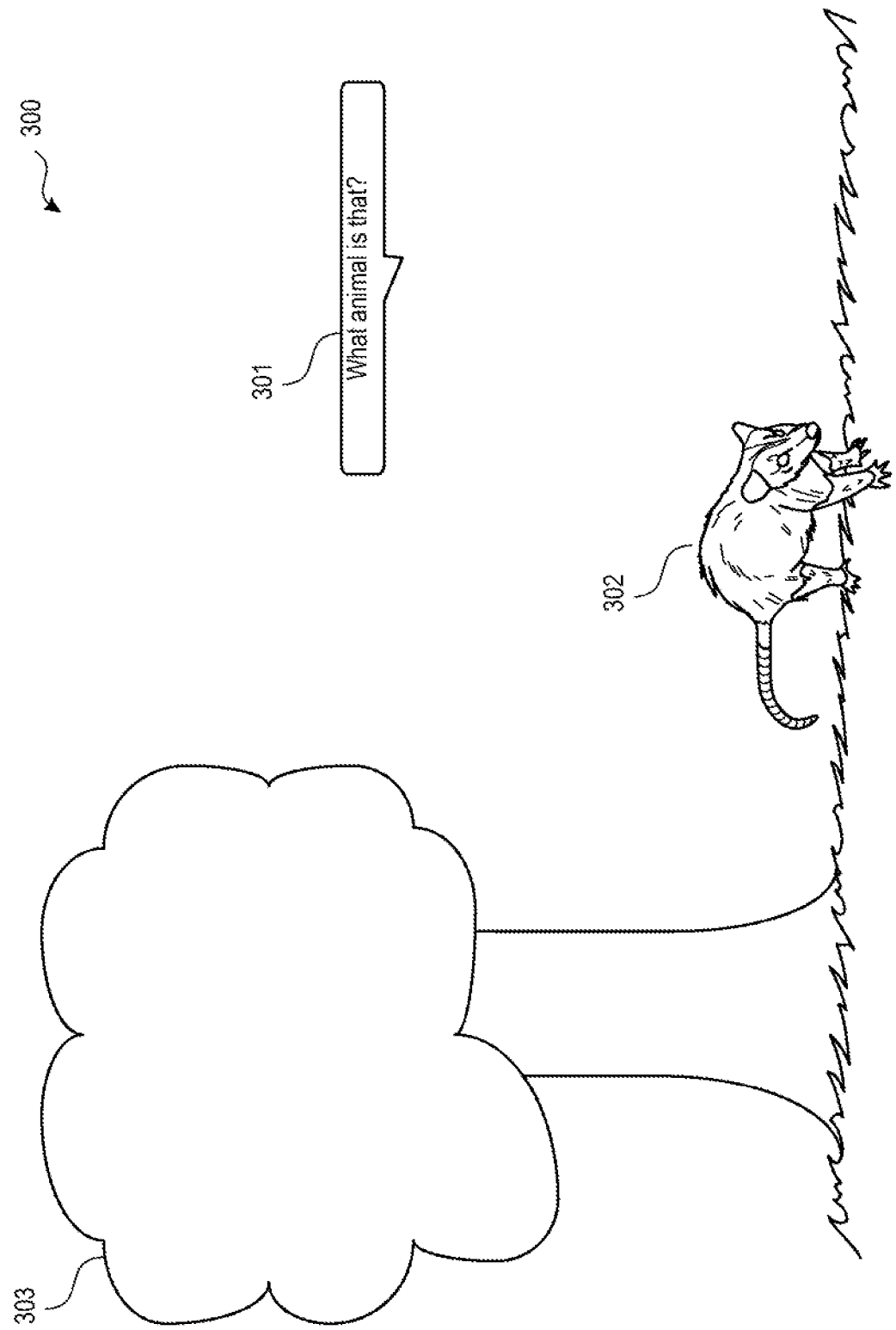
FIG. 3 depicts exemplary contextual data received by an electronic device.

In some examples, before or after the likelihood determination described above, input analyzer 202 may determine whether one or more ambiguous terms or deictic references of spoken input 201 references an object. For example, as shown in FIG. 3, electronic device 100 and digital assistant 200 may receive spoken input 301 "what animal is that?" and input analyzer 202 may determine that the likelihood that additional contextual data is required to satisfy the request of spoken input 301 is over a predetermined threshold as described above. Accordingly, digital assistant 200 enables a camera (e.g., image sensor 108) of electronic device 100 to receive picture 300 as contextual data 203. Input analyzer 202 may then determine which of objects 302 and 303 the deictic reference of spoken input 301 references. In particular, input analyzer 202 may determine based on the use of "animal" in spoken input 301, that spoken input 301 is likely referencing object 302 which is an opossum of picture 300. In some examples, the determination of whether one or more ambiguous terms or deictic references of spoken input 201 references an object may be performed by a different module of digital assistant 200 or by input analyzer 202 and one or more other modules of digital assistant 200.

In some examples, determining whether one or more ambiguous terms or deictic references of spoken input 201 references an object includes performing image processing techniques such as edge detection, edge extraction, optical character recognition, image segmentation, texture analysis, motion analysis, etc. These image processing techniques can be performed through the use of machine learning models, neural networks, deep learning networks, or any other acceptable image processing software and/or module. These image processing techniques may allow input analyzer 202 to determine objects in the image, text in the image, edges in the image, etc.

In some examples, the sensor of electronic device 100 automatically receives contextual data 203 when the sensor is launched by sensor interface 204. For example, digital assistant 200 may cause sensor interface 204 to enable a camera of electronic device 100 when electronic device 100 is a head mounted device. Accordingly, the camera of electronic device 100 may automatically receive contextual data 203 of a picture of the user/electronic device 100's view. As another example, digital assistant 200 may cause sensor interface 204 to enable a camera of electronic device 100 when electronic device 100 is a smart phone. Accordingly, the camera of electronic device 100 may automatically receive contextual data 203 of a picture of the view of electronic device 100, which is distinct from the view of the user in this example. As yet another example, digital assistant 200 may cause sensor interface 204 to enable an accelerometer of electronic device 100. Accordingly, the accelerometer of electronic device 100 may automatically receive contextual data 203 of a speed of electronic device 100.

In some examples, the sensor of electronic device 100 is launched in the background. Accordingly, a user interface for the sensor or any other indication that the sensor is launched is not provided to a user of electronic device 100. As described above, digital assistant 200 may cause sensor interface 204 to enable a camera of electronic device 100 and thus, the camera of electronic device 100 may receive contextual data 203 of a picture in the background, without providing any user interface or other indication. This may also occur with a gyroscope, accelerometer, altimeter, GPS sensor, network detectors, or other sensor of electronic device 100.

Figure 4:
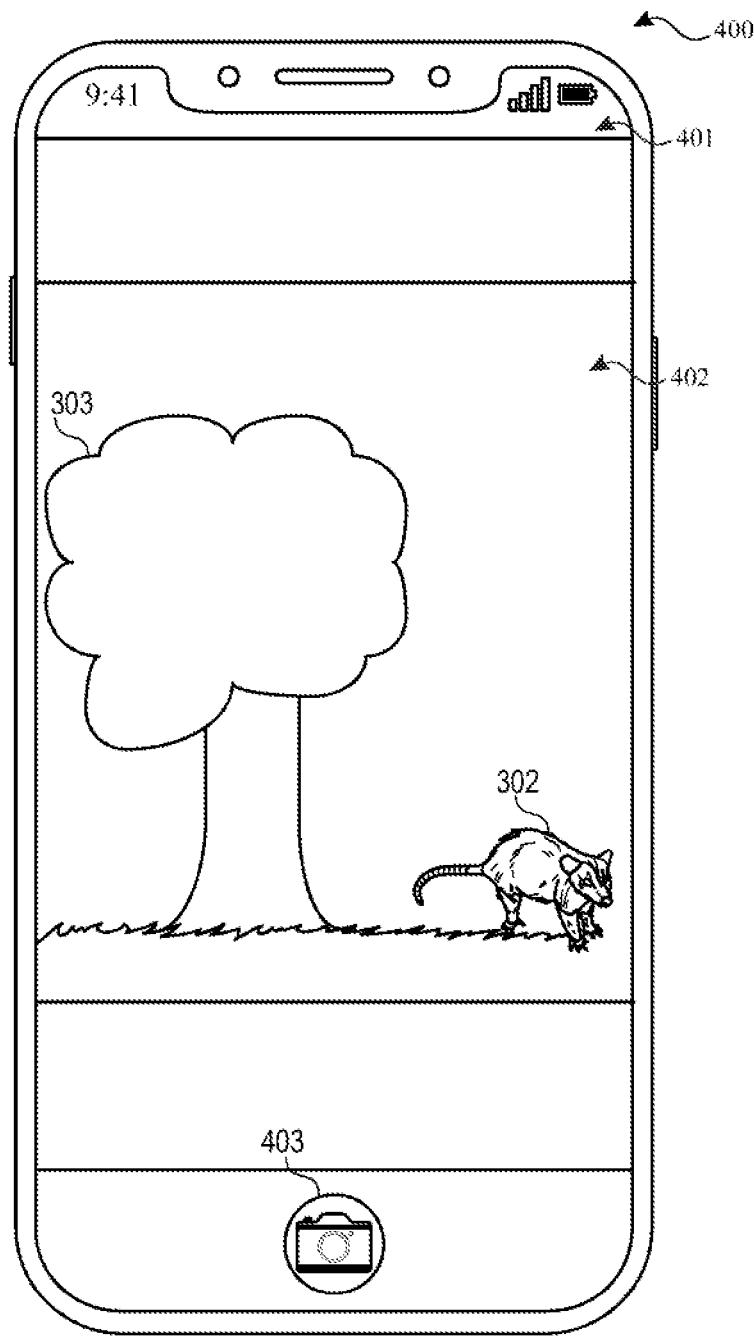
FIG. 4 depicts an exemplary user interface associated with a sensor of an electronic device.

In some examples, launching the sensor of electronic device 100 includes displaying a user interface associated with the sensor on a display of electronic device 100, as shown in FIG. 4. For example, when a camera of electronic device 400 is launched by sensor interface 204, electronic device 400 may display user interface 402 associated with the camera on display 401 of electronic device 400. In some examples, displaying the user interface associated with the sensor includes displaying one or more affordances associated with receiving contextual data 203 on the user interface associated with the sensor. For example, as shown in FIG. 4, user interface 402 includes affordance 403 associated with taking picture 300 including objects 302 and 303. In some examples, affordance 403 or another affordance of user interface 402 may be associated with taking a video stream in addition to or instead of picture 300.

In some examples, the sensor of electronic device 100 receives contextual data when prompted by a user. In some examples, prompting the sensor of electronic device 100 to receive contextual data includes selecting a button of electronic device 100. In some examples, prompting the sensor of electronic device 100 to receive contextual data includes selecting an affordance of the user interface associated with the sensor. Continuing the example discussed above, when electronic device 400 displays user interface 402 associated with the camera, affordance 403 for taking a picture is displayed in user interface 402. Accordingly, the user may select affordance 403 for taking a picture thus prompting the camera of electronic device 400 to receive contextual data 203 of picture 300. Thus, the camera of electronic device 400 receives contextual data 203 (e.g., picture 300) when prompted by the user.

As another example, when an accelerometer of electronic device 100 is launched by sensor interface 204, electronic device 100 may display a user interface associated with the accelerometer which may include an affordance for taking a speed of electronic device 100. Accordingly, the user may select the affordance and prompt the accelerometer of electronic device 100 to receive contextual data 203 of the speed of electronic device 100. Thus, the accelerometer of electronic device 100 receives contextual data 203 of the speed of electronic device 100 when prompted by the user.

In some examples, the input is a voice input confirming the prompt. For example, digital assistant 200 may provide a spoken output of "Would you like to take a picture?" as a prompt to the user. Accordingly, the user may respond with "Yes" to confirm that the camera of electronic device 100 should receive contextual data 203 of a picture or "No" to stop the camera of electronic device 100 from receiving contextual data 203 of the picture.

Figure 5:
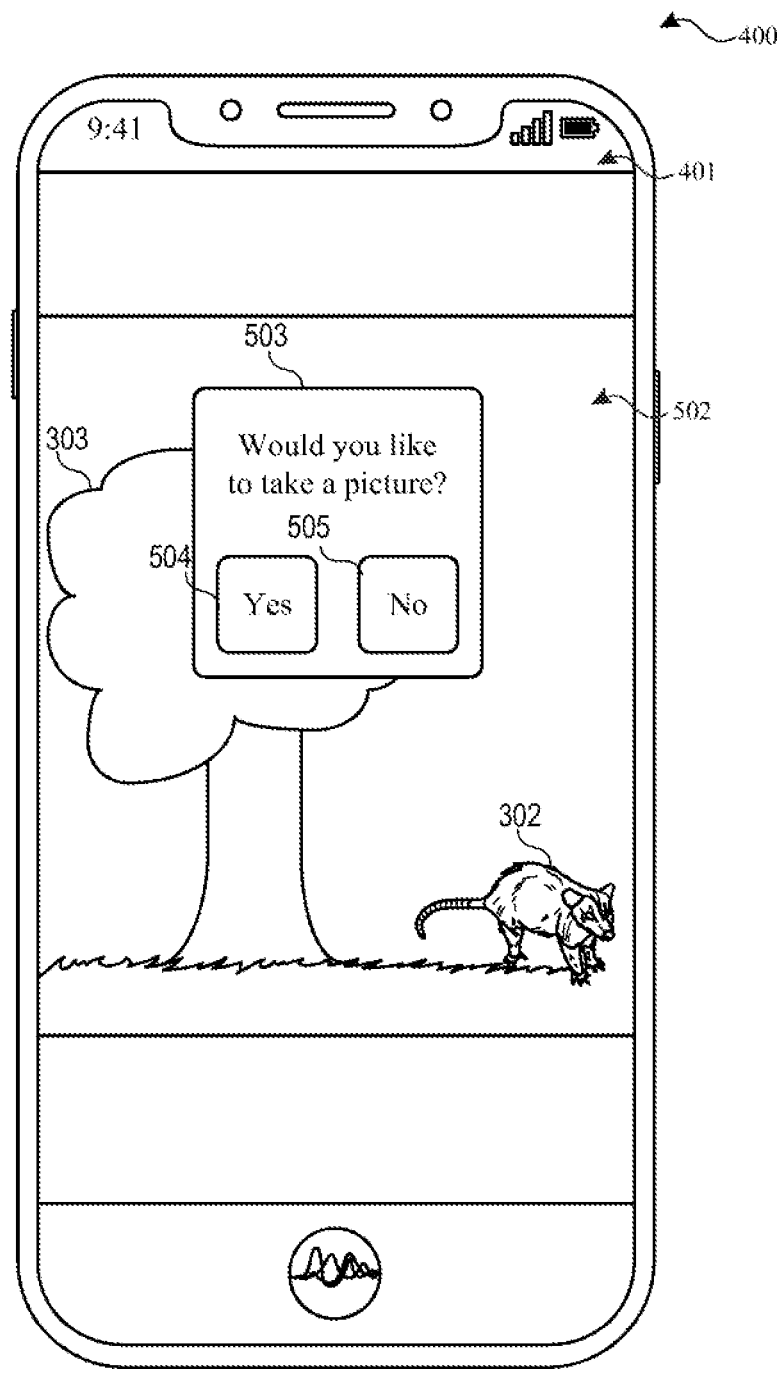
FIG. 5 depicts an exemplary user interface associated with a sensor of an electronic device.

In some examples, the user interface associated with the sensor is displayed in another user interface associated with digital assistant 200. For example, as shown in FIG. 5, electronic device 400 may display user interface 502 including the camera interface inside a user interface associated with the digital assistant 200 on display 401. In this way digital assistant 200 can preserve continuity during the interaction between the user and digital assistant 200. Thus, contextual data 203 of picture 300 may also be displayed in user interface 502, providing contextual data 203 to the user.

In some examples, the user interface associated with the sensor belongs to an application associated with the sensor. In some examples, the application is a first party application. For example, electronic device 100 may have a camera application that is pre-installed. Accordingly, the user interface associated with the camera may belong to the camera application that is pre-installed. In some examples, the application is a third party application. For example, as an alternative or in addition to the first party camera application electronic device 100 may also have a third party camera application installed. Accordingly, the user interface associated with the camera may belong to the third party camera application.

In some examples, digital assistant 200 provides a prompt confirming that contextual data 203 should be received. Digital assistant 200 further receives an input confirming that contextual data 203 should be received or stopping contextual data 203 from being received. In some examples, the input is a selection of a button of electronic device 100 or an affordance of a user interface. For example, as shown in FIG. 5, digital assistant 200 may provide prompt 503 asking "Would you like to take a picture?" in user interface 502 on display 401 of electronic device 400. Prompt 503 may further include affordances 504 and 505 including "yes" and "no," respectively, as options for the user to select. The user may provide an input selecting one of affordances 504 and 505 to confirm that picture 300 should be taken or to stop the taking of picture 300. Accordingly, if the user selects affordance 504 including "yes" electronic device 400 receives picture 300. Conversely, if the user selects affordance 505 including "no" electronic device 400 does not receive picture 300.

After receiving the contextual data, digital assistant 200 provides the spoken input 201 and contextual data 203 to response generator 206 and response generator 206 determines response 207 to the request based on contextual data 203. For example, in response to spoken input 201 "what is that animal?" response generator 206 may provide response 207 "that animal is an opossum," after conducting a search based on contextual data 203 of a picture including the opossum, as described below. As another example, in response to spoken input "where is this?" response generator 206 may provide response 207 "Paris, France" after conducting a search based on contextual data 203 of GPS coordinates of electronic device 100.

In some examples, response generator 206 determines response 207 by performing a search based on contextual data 203. In some examples, the search includes a search of one or more databases of electronic device 100 or connected electronic devices (e.g., servers). In some examples, the search includes a search on the internet, using a search engine, a web site, or similar tools. In some examples, the search includes using an image classifier, object detector, or other neural network or machine learning model to process contextual data 203 for additional information. For example, when contextual data 203 is a picture including an animal, response generator 206 may perform a search with the animal of the picture in local databases and on the internet to determine response 207 to the request of spoken input 201. Accordingly, response generator 206 may determine based on image classifier and database search results of the animal of the picture that the animal is an opossum and generate the response 207 "that animal is an opossum."

In some examples, the search is based on other data in addition to contextual data 203. For example, when contextual data 203 is a picture of the Eiffel Tower, response generator 206 may perform a search for the picture along with location data (e.g., GPS coordinates) of electronic device 100 to inform the search results based on the picture. Accordingly, response generator 206 may determine that the search results indicating pictures similar to contextual data 203 and the determined location data are likely the correct response to the user's request. Thus, response generator 206 may generate the response 207 "Paris, France," to provide to the user.

In some examples, response generator 206 generates response 207 including the results of the search performed based on contextual data 203. For example, when response generator 206 generates response 207 "that animal is an opossum," response generator 206 may also include results of the internet search for the animal in response 207. Accordingly, response 207 may include hyperlinks to websites that provide information about opossums or other references or information the user may find helpful in answering their request.

Digital assistant 200 then provides response 207 to the request. In some examples, the response to the request is provided as an audio output. For example, digital assistant 200 may provide response 207 "that animal is an opossum," as an audio output. In some examples, the response to the request is provided on a display of electronic device 100. For example, digital assistant 200 may provide response 207 "that animal is an opossum," on a display of electronic device 100. In some examples, digital assistant 200 provides the response on a display of electronic device 100 and echoes the displayed response as an audio output. Accordingly, digital assistant 200 may both display response 207 "that animal is an opossum," on a display of electronic device 100 while providing response 207 "that animal is an opossum," as an audio output.

In some examples, digital assistant 200 provides other information in addition to response 207 on a display of electronic device 100 while providing response 207 as an audio output. For example, digital assistant 200 may provide response 207 "that animal is an opossum," as an audio output and then provide on a display of electronic device 100 the same response in addition to the search results related to the opossum including one or more facts, hyperlinks, or other information that may be helpful to the user.

In some examples, after providing the response to the request digital assistant 200 stores (e.g., saves) contextual data 203. For example, after providing response 207 "that animal is an opossum," digital assistant 200 may store or save contextual data 203 of the picture including the opossum for future reference by digital assistant 200 and/or the user. In some examples, digital assistant 200 stores the results of the search and/or the response in addition to contextual data 203. Continuing the example above, digital assistant 200 may also store or save the search results related to the opossum for further reference by digital assistant 200 and/or the user to answer further requests or provide further information.

In some examples, digital assistant 200 discards (e.g., deletes) contextual data 203. For example, after providing the response digital assistant 200 may determine that contextual data 203 was unhelpful or is unnecessary for further responses and may thus discard or delete contextual data 203.

Based on the disclosure above, it will be understood that the methods and structure described allow a digital assistant and an electronic device to use one or more sensors to determine if additional sensors should be enabled and data received to respond to one or more requests provided by a user. In this way, sensors may be selectively activated as required, reducing the processing needed at one time and conserving battery.

Figure 6:
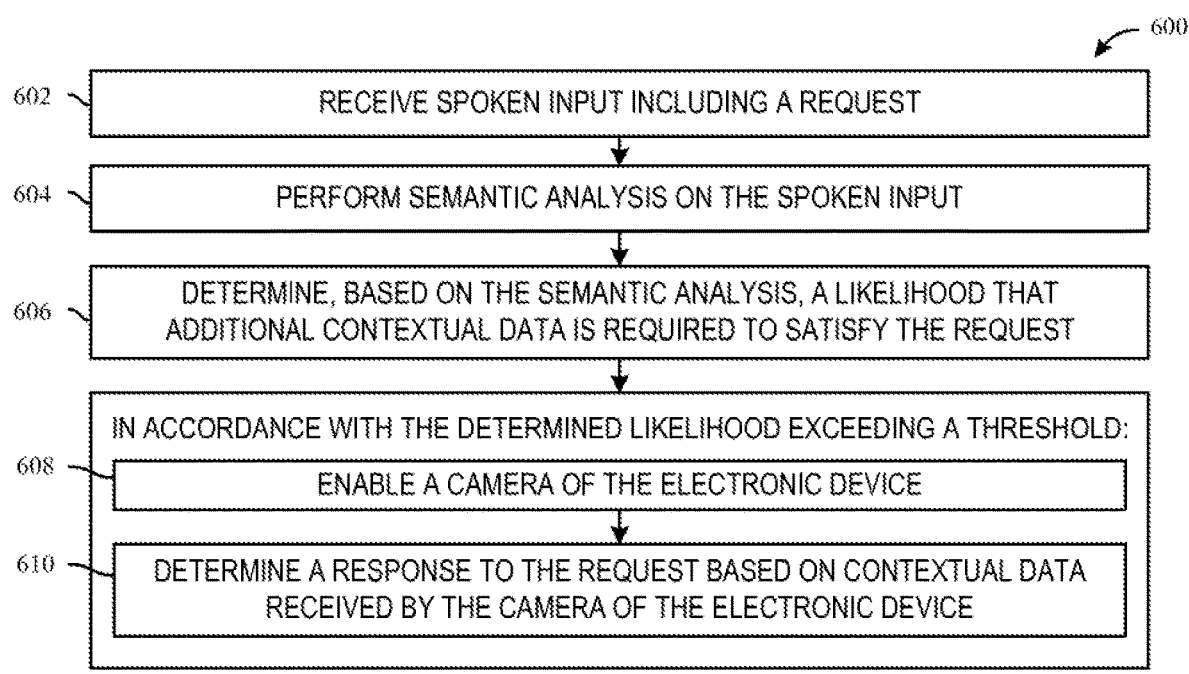
FIG. 6 is a flow diagram illustrating a process for determining a response to a request.

FIG. 6 is a flow diagram illustrating a process for determining a response to a request, according to various examples. Method 600 is performed at a device (e.g., device 100, 400) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 600 are, optionally, combined, the orders of some operations are, optionally, changed, and some operations are, optionally, omitted.

At block 602, a spoken input (e.g., spoken input 201) including a request is received. In some examples, the request includes an ambiguous term.

At block 604, a semantic analysis on the spoken input (e.g., spoken input 201) is performed. In some examples, performing the semantic analysis on the spoken input further comprises determining whether the request includes an ambiguous term. In some examples, in accordance with a determination that the request includes the ambiguous term, whether the ambiguous term references an object (e.g., object 302, object 303) is determined.

At block 606, a likelihood that additional contextual data (e.g., contextual data 203, picture 300) is required to satisfy the request is determined based on the semantic analysis. In some examples, determining, based on the semantic analysis, the likelihood that additional contextual data is required to satisfy the request further comprises determining movement of the electronic device (e.g., electronic device 100, electronic device 400) during the reception of the spoken input (e.g., spoken input 201). In some examples, determining, based on the semantic analysis, the likelihood that additional contextual data is required to satisfy the request further comprises determining movement of the electronic device is below a threshold for a predetermined time after receiving the spoken input.

In some examples, determining, based on the semantic analysis, the likelihood that additional contextual data (e.g., contextual data 203, picture 300) is required to satisfy the request further comprises determining a pose of the electronic device (e.g., electronic device 100, electronic device 400) after receiving the spoken input (e.g., spoken input 201). In some examples, determining, based on the semantic analysis, the likelihood that additional contextual data is required to satisfy the request further comprises determining a gaze of a user while receiving the spoken input. In some examples, determining, based on the semantic analysis, the likelihood that additional contextual data is required to satisfy the request further comprises determining a location of the electronic device after receiving the spoken input.

At block 608, in accordance with the determined likelihood exceeding a threshold a camera (e.g., image sensor 108) of the electronic device (e.g., electronic device 100, electronic device 400) is enabled. In some examples, the camera of the electronic device is enabled in the background. In some examples, a picture (e.g., picture 300) is taken with the camera of the electronic device.

In some examples, a user interface (e.g., user interface 402, user interface 502) associated with the camera (e.g., image sensor 108) of the electronic device (e.g., electronic device 100, electronic device 400) is displayed. In some examples, the user interface associated with the camera of the electronic device belongs to a camera application. In some examples, a prompt (e.g., prompt 503) confirming that the picture (e.g., picture 300) should be taken is provided. In some examples, a user input confirming that the picture should be taken is received. In some examples, a picture is taken with the camera of the electronic device.

At block 610, a response (e.g., response 207) to the request is determined based on the contextual data (e.g., contextual data 203, picture 300) received by the camera (e.g., image sensor 108) of the electronic device (e.g., electronic device 100, electronic device 400). In some examples, determining the response to the request based on contextual data received by the camera of the electronic device further comprises performing a search based on the data received by the camera and providing the response to the request based on the results of the search. In some examples, the search is based on other contextual data in addition to the contextual data received by the camera. In some examples, the contextual data received by the camera is saved. In some examples, after providing the response to the request, the contextual data received by the camera is discarded As described above, one aspect of the present technology is the gathering and use of data available from various sources to reference and object determination of a request. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver accurate responses to requests that are of greater interest to the user. Accordingly, use of such personal information data enables users calculated control of response resolution. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining the privacy and security of personal information data. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of enabling sensors, the present technology can be configured to allow users to select to "opt in" or "opt out" of participation in the collection of personal information data during registration for services or anytime thereafter. In another example, users can select to limit the length of time captured data and/or requests are maintained or entirely prohibit the development of saving the data or requests. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, sensors can be enabled by inferring preferences based on non-personal information data or a bare minimum amount of personal information, such as non-personal information available to the digital assistant, or publicly available information.

What is claimed is:

1. An electronic device comprising:
   one or more processors;
   a memory; and
   one or more programs, wherein the one or more programs are stored in the memory and configured to be executed by the one or more processors, the one or more programs including instructions for:
   receiving a spoken input including a request;
   performing a semantic analysis on the spoken input;
   determining, based on the semantic analysis and movement of the electronic device during the reception of the spoken input, a likelihood that the electronic device requires additional contextual data to satisfy the request;
   in accordance with the determined likelihood exceeding a threshold:
   enabling a camera of the electronic device; and
   determining a response to the request based on contextual data received by the camera of the electronic device.

2. The electronic device of claim 1, wherein the request includes an ambiguous term.

3. The electronic device of claim 1, wherein performing the semantic analysis on the spoken input further comprises:
   determining whether the request includes an ambiguous term.

4. The electronic device of claim 3, the one or more programs further including instructions for:
   in accordance with a determination that the request includes the ambiguous term, determining whether the ambiguous term references an object.

5. The electronic device of claim 1, wherein determining the likelihood that the electronic device requires additional contextual data to satisfy the request further comprises:
   determining that movement of the electronic device is below a threshold for a predetermined time after receiving the spoken input.

6. The electronic device of claim 1, wherein determining the likelihood that the electronic device requires additional contextual data to satisfy the request further comprises:
   determining a pose of the electronic device after receiving the spoken input.

7. The electronic device of claim 1, wherein determining the likelihood that additional contextual data is required to satisfy the request further comprises:
   determining a gaze of a user while receiving the spoken input.

8. The electronic device of claim 1, wherein determining the likelihood that additional contextual data is required to satisfy the request further comprises:
   determining a location of the electronic device after receiving the spoken input.

9. The electronic device of claim 1, the one or more programs further including instructions for:
   taking a picture with the camera of the electronic device.

10. The electronic device of claim 1, wherein the one or more programs further include instructions for:
    displaying a user interface associated with the camera of the electronic device.

11. The electronic device of claim 10, wherein the user interface associated with the camera of the electronic device belongs to a camera application.

12. The electronic device of claim 11, the one or more programs further including instructions for:
    providing a prompt confirming that a picture will be taken;
    receiving a user input confirming that the picture will be taken; and
    taking a picture with the camera of the electronic device.

13. The electronic device of claim 1, wherein determining a response to the request based on contextual data received by the camera of the electronic device further comprises:
    performing a search based on the data received by the camera; and providing the response to the request based on the results of the search.

14. The electronic device of claim 13, wherein the search is based on other contextual data in addition to the contextual data received by the camera.

15. The electronic device of claim 13, the one or more programs further including instructions for:
after providing the response to the request, discarding the contextual data received by the camera.

16. The electronic device of claim 1, the one or more programs further including instructions for:
saving the contextual data received by the camera.

17. A non-transitory computer-readable storage medium storing one or more programs, the one or more programs comprising instructions, which when executed by one or more processors of an electronic device cause the electronic device to:
receive a spoken input including a request;
perform a semantic analysis on the spoken input;
determine, based on the semantic analysis and movement of the electronic device during the reception of the spoken input, a likelihood that the electronic device requires additional contextual data to satisfy the request;
in accordance with the determined likelihood exceeding a threshold:
enable a camera of the electronic device; and
determine a response to the request based on contextual data received by the camera of the electronic device.

18. The non-transitory computer-readable storage medium of claim 17, wherein the request includes an ambiguous term.

19. The non-transitory computer-readable storage medium of claim 17, wherein performing the semantic analysis on the spoken input further comprises:
determining whether the request includes an ambiguous term.

20. The non-transitory computer-readable storage medium of claim 19, the one or more programs further including instructions for:
in accordance with a determination that the request includes the ambiguous term, determining whether the ambiguous term references an object.

21. The non-transitory computer-readable storage medium of claim 17, wherein determining the likelihood that the electronic device requires additional contextual data to satisfy the request further comprises:
determining that movement of the electronic device is below a threshold for a predetermined time after receiving the spoken input.

22. The non-transitory computer-readable storage medium of claim 17, wherein determining the likelihood that the electronic device requires additional contextual data to satisfy the request further comprises:
determining a pose of the electronic device after receiving the spoken input.

23. The non-transitory computer-readable storage medium of claim 17, wherein determining the likelihood that additional contextual data is required to satisfy the request further comprises:
determining a gaze of a user while receiving the spoken input.

24. The non-transitory computer-readable storage medium of claim 17, wherein determining the likelihood that additional contextual data is required to satisfy the request further comprises:
determining a location of the electronic device after receiving the spoken input.

25. The non-transitory computer-readable storage medium of claim 17, the one or more programs further including instructions for:
taking a picture with the camera of the electronic device.

26. The non-transitory computer-readable storage medium of claim 17, wherein the one or more programs further include instructions for:
displaying a user interface associated with the camera of the electronic device.

27. The non-transitory computer-readable storage medium of claim 26, wherein the user interface associated with the camera of the electronic device belongs to a camera application.

28. The non-transitory computer-readable storage medium of claim 27, the one or more programs further including instructions for:
providing a prompt confirming that a picture will be taken;
receiving a user input confirming that the picture will be taken; and
taking a picture with the camera of the electronic device.

29. The non-transitory computer-readable storage medium of claim 17, wherein determining a response to the request based on contextual data received by the camera of the electronic device further comprises:
performing a search based on the data received by the camera; and
providing the response to the request based on the results of the search.

30. The non-transitory computer-readable storage medium of claim 29, wherein the search is based on other contextual data in addition to the contextual data received by the camera.

31. The non-transitory computer-readable storage medium of claim 29, the one or more programs further including instructions for:
after providing the response to the request, discarding the contextual data received by the camera.

32. The non-transitory computer-readable storage medium of claim 17, the one or more programs further including instructions for:
saving the contextual data received by the camera.

33. A method, comprising:
at an electronic device with one or more processors and memory:
receiving a spoken input including a request;
performing a semantic analysis on the spoken input;
determining, based on the semantic analysis and movement of the electronic device during the reception of the spoken input, a likelihood that additional contextual data is required to satisfy the request;
in accordance with the determined likelihood exceeding a threshold:
enabling a camera of the electronic device; and
determining a response to the request based on contextual data received by the camera of the electronic device.

34. The method of claim 33, wherein the request includes an ambiguous term.

35. The method of claim 33, wherein performing the semantic analysis on the spoken input further comprises:
determining whether the request includes an ambiguous term.

36. The method of claim 35, further comprising:
in accordance with a determination that the request includes the ambiguous term, determining whether the ambiguous term references an object.

37. The method of claim 33, wherein determining the likelihood that the electronic device requires additional contextual data to satisfy the request further comprises:
determining that movement of the electronic device is below a threshold for a predetermined time after receiving the spoken input.

38. The method of claim 33, wherein determining the likelihood that the electronic device requires additional contextual data to satisfy the request further comprises:
determining a pose of the electronic device after receiving the spoken input.

39. The method of claim 33, wherein determining the likelihood that additional contextual data is required to satisfy the request further comprises:
determining a gaze of a user while receiving the spoken input.

40. The method of claim 33, wherein determining the likelihood that additional contextual data is required to satisfy the request further comprises:
determining a location of the electronic device after receiving the spoken input.

41. The method of claim 33, further comprising:
taking a picture with the camera of the electronic device.

42. The method of claim 33, further comprising:
displaying a user interface associated with the camera of the electronic device.

43. The method of claim 42, wherein the user interface associated with the camera of the electronic device belongs to a camera application.

44. The method of claim 43, further comprising:
providing a prompt confirming that a picture will be taken;
receiving a user input confirming that the picture will be taken; and
taking a picture with the camera of the electronic device.

45. The method of claim 33, wherein determining a response to the request based on contextual data received by the camera of the electronic device further comprises:
performing a search based on the data received by the camera; and
providing the response to the request based on the results of the search.

46. The method of claim 45, wherein the search is based on other contextual data in addition to the contextual data received by the camera.

47. The method of claim 45, further comprising:
after providing the response to the request, discarding the contextual data received by the camera.

48. The method of claim 33, further comprising:
saving the contextual data received by the camera.

* * * * *